US012110040B2

(12) United States Patent
Molinari (10) Patent No.: US 12,110,040 B2
(45) Date of Patent: Oct. 8, 2024

(54) NAVIGATION COST COMPUTATION FOR LANE CHANGES BEFORE A CRITICAL INTERSECTION (71) Applicant: TOYOTA RESEARCH INSTITUTE, INC., Los Altos, CA (US)

(72) Inventor: Daniele Molinari, Sunnyvale, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 664 days.

(21) Appl. No.: 16/888,342

(22) Filed: May 29, 2020

(65) Prior Publication Data
US 2021/0370978 A1 Dec. 2, 2021

(51) Int. Cl.
B60W 60/00 (2020.01)
B60W 30/18 (2012.01)
G01C 21/34 (2006.01)
G06N 3/04 (2023.01)
G08G 1/16 (2006.01)
H04W 4/46 (2018.01)

(52) U.S. Cl.
CPC .. *B60W 60/0025* (2020.02); *B60W 30/18154* (2013.01); *B60W 30/18163* (2013.01); *G01C 21/3453* (2013.01); *G06N 3/04* (2013.01); *G08G 1/167* (2013.01); *H04W 4/46* (2018.02); *B60W 2556/65* (2020.02)

(58) Field of Classification Search
CPC ..... B60W 30/18154; B60W 30/18159; B60W 30/18163; B60W 30/095; B60W 30/0956; B60W 60/001; B60W 60/0011; B60W 60/0025; B60W 2554/4045; B60W 2556/65; G01C 21/3453; G06N 3/04; G08G 1/16; G08G 1/167; G08G 1/22; H04W 4/44; H04W 4/46
USPC .......................................................... 701/26
See application file for complete search history.

(56) References Cited

U.S. PATENT DOCUMENTS

| | | | |
|---|---|---|---|
| 9,159,023 B2 | 10/2015 | Bone et al. | |
| 9,672,734 B1 | 6/2017 | Ratnasingam | |
| 9,933,781 B1 | 4/2018 | Bando et al. | |
| 10,431,095 B2 | 10/2019 | Jain et al. | |
| 2005/0015203 A1 | 1/2005 | Nishira | |
| 2012/0109521 A1* | 5/2012 | Rothschild | G08G 1/167 701/487 |
| 2016/0091897 A1 | 3/2016 | Nilsson et al. | |
| 2016/0138924 A1 | 5/2016 | An | |
| 2016/0238404 A1 | 8/2016 | Okada et al. | |
| 2016/0267790 A1 | 9/2016 | Raamot | |
| 2017/0227966 A1 | 8/2017 | Mozen et al. | |
| 2018/0186378 A1 | 7/2018 | Zhuang et al. | |
| 2018/0319403 A1* | 11/2018 | Buburuzan | B60W 30/18163 |

(Continued)

*Primary Examiner* — Maceeh Anwari
(74) *Attorney, Agent, or Firm* — SEYFARTH SHAW LLP (57) ABSTRACT A method to select between tactical driving decisions of a controlled ego vehicle to reach a target destination is described. The method includes determining upcoming tactical driving decisions of the controlled ego vehicle to reach the target destination according to a mission plan. The method also includes ranking upcoming tactical driving maneuvers associated with each of the upcoming tactical driving decisions. The method further includes selecting a tactical driving maneuver prior to a critical intersection according to the ranking of the upcoming tactical driving maneuvers to reach the target destination according to the mission plan.

20 Claims, 7 Drawing Sheets (56) References Cited

U.S. PATENT DOCUMENTS

| | | |
|---|---|---|
| 2019/0061765 A1 | 2/2019 | Marden et al. |
| 2019/0100211 A1* | 4/2019 | Liu ...................... B60W 10/18 |
| 2019/0171206 A1* | 6/2019 | Abrams ............. G01C 21/3658 |
| 2019/0185011 A1 | 6/2019 | Zheng et al. |
| 2019/0324475 A1 | 10/2019 | Dean et al. |
| 2019/0329771 A1 | 10/2019 | Wray et al. |
| 2020/0079380 A1* | 3/2020 | Yu .......................... G06N 3/088 |
| 2020/0307589 A1* | 10/2020 | Li .......................... B60W 30/16 |
| 2021/0107566 A1* | 4/2021 | Seegmiller ............. H04W 4/02 |

\* cited by examiner

NAVIGATION COST COMPUTATION FOR LANE CHANGES BEFORE A CRITICAL INTERSECTION

BACKGROUND

Field

Certain aspects of the present disclosure generally relate to autonomous vehicle technology and, more particularly, to a navigation cost computation for a lane change before a critical intersection.

Background

Autonomous agents (e.g., vehicles, robots, etc.) rely on machine vision for sensing a surrounding environment by analyzing areas of interest in a scene from images of the surrounding environment. Although scientists have spent decades studying the human visual system, a solution for realizing equivalent machine vision remains elusive. Realizing equivalent machine vision is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and have become a reality in this decade. Because autonomous agents have to interact with humans, however, many critical concerns arise. For example, how to design vehicle control of an autonomous vehicle using machine learning. Unfortunately, vehicle control by machine learning is less effective in complicated traffic environments involving complex interactions between vehicles (e.g., a situation where a controlled (ego) vehicle merges/changes onto/into a traffic lane before a critical intersection).

Machine learning techniques for vehicle control using a network to select a vehicle control action for an ego vehicle are desired. For example, a selected speed/acceleration/steering angle of the controlled (ego) vehicle may be applied as a vehicle control action. These conventional machine learning techniques do not consider a cost function component of a current traffic state for selecting vehicle control actions.

SUMMARY

A method to select between tactical driving decisions of a controlled ego vehicle to reach a target destination is described. The method includes determining upcoming tactical driving decisions of the controlled ego vehicle to reach the target destination according to a mission plan. The method also includes ranking upcoming tactical driving maneuvers associated with each of the upcoming tactical driving decisions. The method further includes selecting a tactical driving maneuver prior to a critical intersection according to the ranking of the upcoming tactical driving maneuvers to reach the target destination according to the mission plan.

A non-transitory computer-readable medium having program code recorded thereon to select between tactical driving decisions of a controlled ego vehicle to reach a target destination is described. The program code is executed by a processor. The non-transitory computer-readable medium includes program code to determine upcoming tactical driving decisions of the controlled ego vehicle to reach the target destination according to a mission plan. The non-transitory computer-readable medium also includes program code to rank upcoming tactical driving maneuvers associated with each of the upcoming tactical driving decisions. The non-transitory computer-readable medium further includes program code to select a tactical driving maneuver prior to a critical intersection according to the ranking of the upcoming tactical driving maneuvers to reach the target destination according to the mission plan.

A system to select between tactical driving decisions of a controlled ego vehicle to reach a target destination is described. The system includes a vehicle perception module, including a convolutional neural network configured to determine upcoming tactical driving decisions of the controlled ego vehicle to reach the target destination according to a mission plan. The system also includes a navigation cost function module configured to rank upcoming tactical driving maneuvers associated with each of the upcoming tactical driving decisions. The system further includes a vehicle control selection module configured to select a tactical driving maneuver prior to a critical intersection according to the ranking of the upcoming tactical driving maneuvers to reach the target destination according to the mission plan.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality, in addition to or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways and roadways affects millions of people and presents an urgent problem to solve. In particular, vehicles may perform lane changes prior to roadway intersections, which may generate traffic oscillations and extra congestion. For example, irregular lane changes proximate a critical intersection are a significant source of traffic congestion. As a result, roadway traffic is potentially congested due to irregular lane change behavior and unexpected braking maneuvers of surrounding vehicles. Automated vehicles are expected to reduce traffic accidents and improve traffic efficiency. In particular, automation of vehicle control on roadways and highways is rapidly advancing, which may eventually reduce traffic accidents and improve traffic efficiency.

Reducing traffic congestion may be achieved by effectively directing timing and speed of controlled vehicles. For example, the timing and speed of vehicles may be controlled when changing lanes before a critical intersection in a manner that does not detrimentally affect traffic on the roadway. According to one aspect of the present disclosure, a vehicle merge control system is described to effectively merge a controlled vehicle into a target lane before a critical intersection, while reducing the traffic impact on the roadway.

Vehicle control by machine learning is less effective in complicated traffic environments. For example, these traffic environments may involve complex interactions between vehicles, including situations where a controlled (ego) vehicle merges into a target lane before a critical intersection. Conventional machine learning techniques for vehicle control may use a network to select an appropriate vehicle control action from input data relative to the ego vehicle. For example, a selected speed/acceleration/steering angle of the controlled (ego) vehicle may be applied as a vehicle control action to enter a merge gap. As described herein, a "merge gap" is a gap located between two vehicles in a target lane into which an ego vehicle may desire to merge. As also described herein, a "critical intersection" refers to an intersection in which the ego vehicle desires to perform some action, such as turning (e.g., left turn, right turn, or U-turn) the ego vehicle at the intersection.

Unfortunately, conventional machine learning techniques do not consider a cost function based on a current traffic state for selecting vehicle control actions. For example, conventional machine learning techniques do not view a merge gap according to a cost function. Rather, conventional machine learning techniques view a "merge gap" as an open space without a cost function component. Aspects of the present disclosure provide an improvement over conventional machine learning techniques by using a cost function for performing lane changes before critical intersections. This aspect of the present disclosure seeks to minimize a cost function for determining when to change lanes before a critical intersection, allowing an ego vehicle to more safely enter a target lane (e.g., a turn lane) to perform a desired action. The vehicle behavior control system is an improvement over the current technology by using a cost function. The cost function enables a more computationally efficient vehicle behavior control system for determining when to change lanes before a critical intersection.

Aspects of the present disclosure are directed to a vehicle behavior control system that assesses a "navigation cost" of a "tactical driving decision," which is also referred to as a "driving maneuver." As described herein, a tactical driving decision (or driving maneuver) refers to a high level decision during operation of an ego vehicle. In a simplest form, the high level decision is made whether to maintain the ego vehicle in the current lane or change lanes to a target lane (e.g., a left/right merge operation). As described herein, a navigation cost may refer to a number that informs the autonomous driving agent (e.g., vehicle behavior control system) of "how good" a given driving maneuver is to achieve the driving agent's goal (e.g., reaching a certain destination).

Aspects of the present disclosure assess a navigation cost of a tactical driving decision to improve a vehicle behavior control system. One aspect of the present disclosure uses data from a perception system of the ego vehicle and/or data received from other connected vehicles (e.g., via vehicle-to-vehicle (V2V) communication in connected vehicle environments). Using this data, when determining whether to perform a tactical driving maneuver at a critical intersection, the vehicle behavior control system uses a cost function (sometimes referred to as a loss function). For example, the vehicle behavior controller determines the cost of performing a lane change before a critical intersection. The vehicle behavior control system may be mounted within the ego vehicle and includes a processor in communication with a vehicle perception system. The vehicle perception system can include a number of different sensors, such as cameras, a light detection and ranging (LiDAR) sensor or a radio detection and ranging (RADAR) sensor, sonar, or other like sensor. Additionally, the vehicle behavior control system may communicate with other connected vehicles using V2V communication.

According to aspects of the present disclosure, the vehicle merge control system seeks to minimize a cost function for determining when to change lanes before a critical intersection. The cost function for determining when to change lanes before a critical intersection includes the following: a total distance to the destination added to the number of lane changes multiplied by a factor that decreases with the distance to the critical intersection. The vehicle behavior control system for piloting the ego vehicle focuses on reducing the cost function as much as possible. For example, a loss function or cost function is a function that maps an event or values of one or more variables onto a real number intuitively representing some "cost" associated with the event (e.g., a tactical driving decision). An optimization problem seeks to minimize a loss function. An objective function is either a loss function or its negative function (in specific domains, variously called a reward function, a profit function, a utility function, a fitness function, etc.), in which case it is to be maximized.

Figure 1:
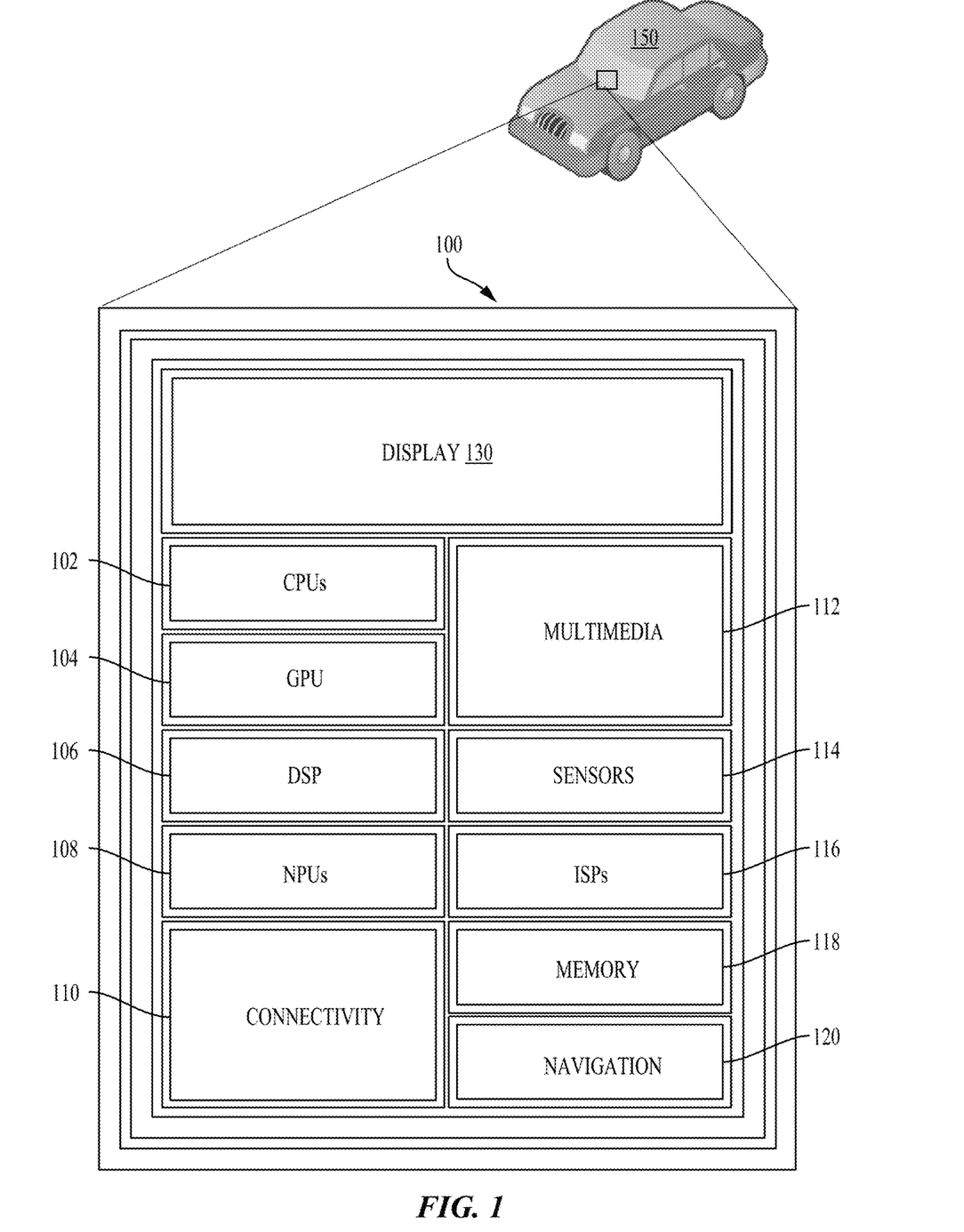
FIG. 1 illustrates an example implementation of designing a neural network using a system-on-a-chip (SOC) for a vehicle behavior control system, in accordance with aspects of the present disclosure.

FIG. 1 illustrates an example implementation of the aforementioned system and method for a vehicle behavior control system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, assess a navigation cost of a tactical driving decision to improve a vehicle behavior control system to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include code to determine upcoming tactical driving decisions of the controlled ego vehicle to reach the target destination according to a mission plan. The instructions loaded into a processor (e.g., CPU 102) may also include code to rank upcoming tactical driving maneuvers associated with each of the upcoming tactical driving decisions. The instructions loaded into a processor (e.g., CPU 102) may also include code to select a tactical driving maneuver prior to a critical intersection according to the ranking of the upcoming tactical driving maneuvers to reach the target destination according to the mission plan.

Figure 2:
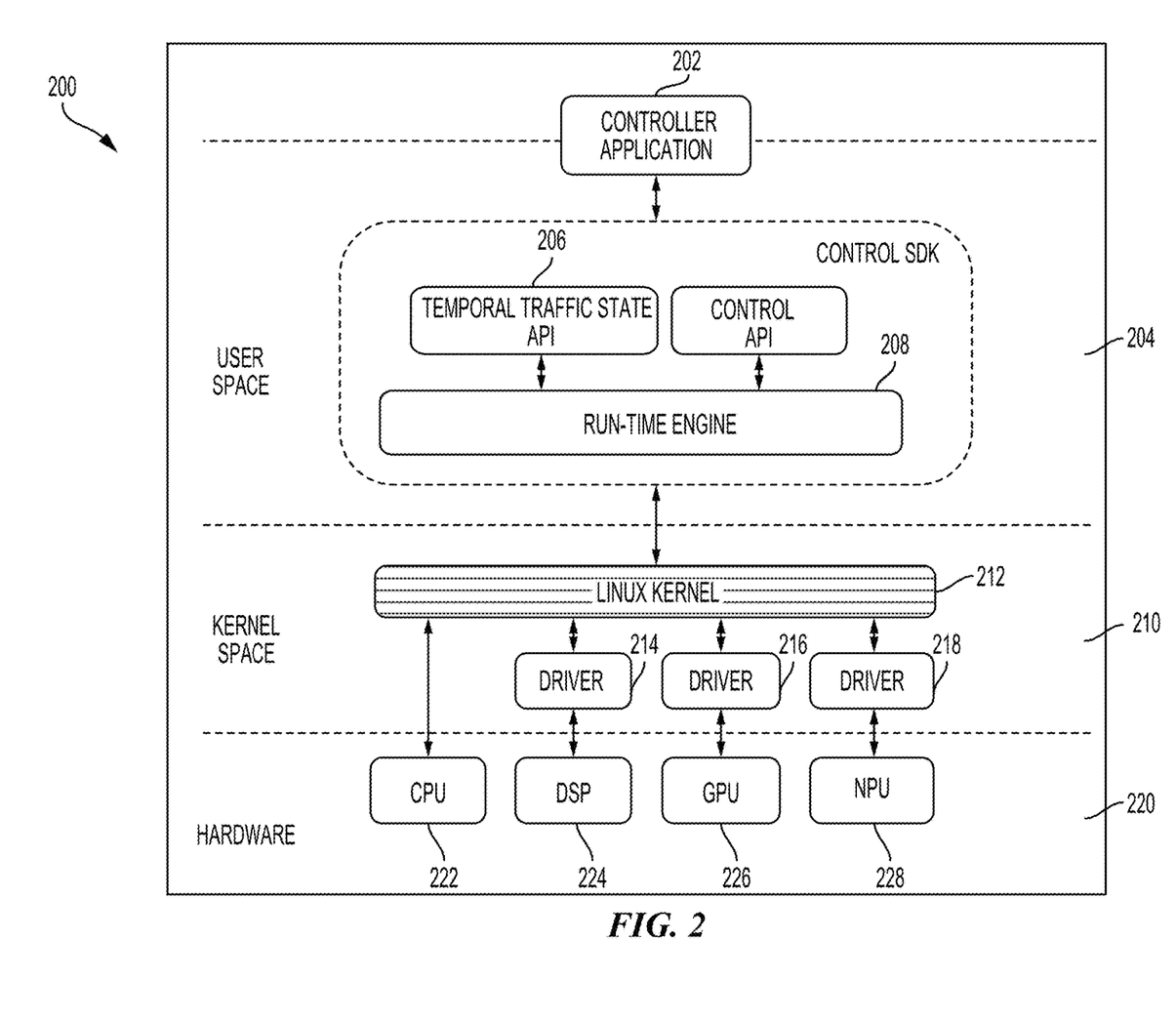
FIG. 2 is a block diagram illustrating a software architecture that may modularize artificial intelligence (AI) functions for a vehicle behavior control system of an autonomous agent, according to aspects of the present disclosure.

FIG. 2 is a block diagram illustrating a software architecture 200 that may modularize artificial intelligence (AI) functions for selecting a vehicle control action of an autonomous agent using a navigation cost function based on a current goal destination, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202. While FIG. 2 describes the software architecture 200 for selecting a vehicle control action of an autonomous agent, it should be recognized that vehicle action control functionality is not limited to autonomous agents. According to aspects of the present disclosure, vehicle action control functionality is applicable to any vehicle type, provided the vehicle is equipped with appropriate functions (e.g., vehicle-to-vehicle (V2V) communication) of connected vehicle applications and/or an advanced driver assistance system (ADAS).

The controller application 202 may be configured to call functions defined in a user space 204 that may, for example, provide for vehicle action control services. The controller application 202 may make a request to compile program code associated with a library defined in a temporal traffic state application programming interface (API) 206 to perform a vehicle behavior action control selection. Selection of the vehicle behavior control action may ultimately rely on the output of a convolutional neural network configured to select a vehicle control action of an autonomous agent using a navigation cost function based on a current goal destination of the autonomous agent.

A run-time engine 208, which may be compiled code of a runtime framework, may be further accessible to the controller application 202. The controller application 202 may cause the run-time engine 208, for example, to take actions for controlling the autonomous agent. When an ego vehicle intends to merge onto a traffic lane, the run-time engine 208 may in turn send a signal to an operating system 210, such as a Linux Kernel 212, running on the SOC 220. FIG. 2 illustrates the Linux Kernel 212 as software architecture for implementing control of an autonomous agent using temporal traffic state information. It should be recognized, however, that aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
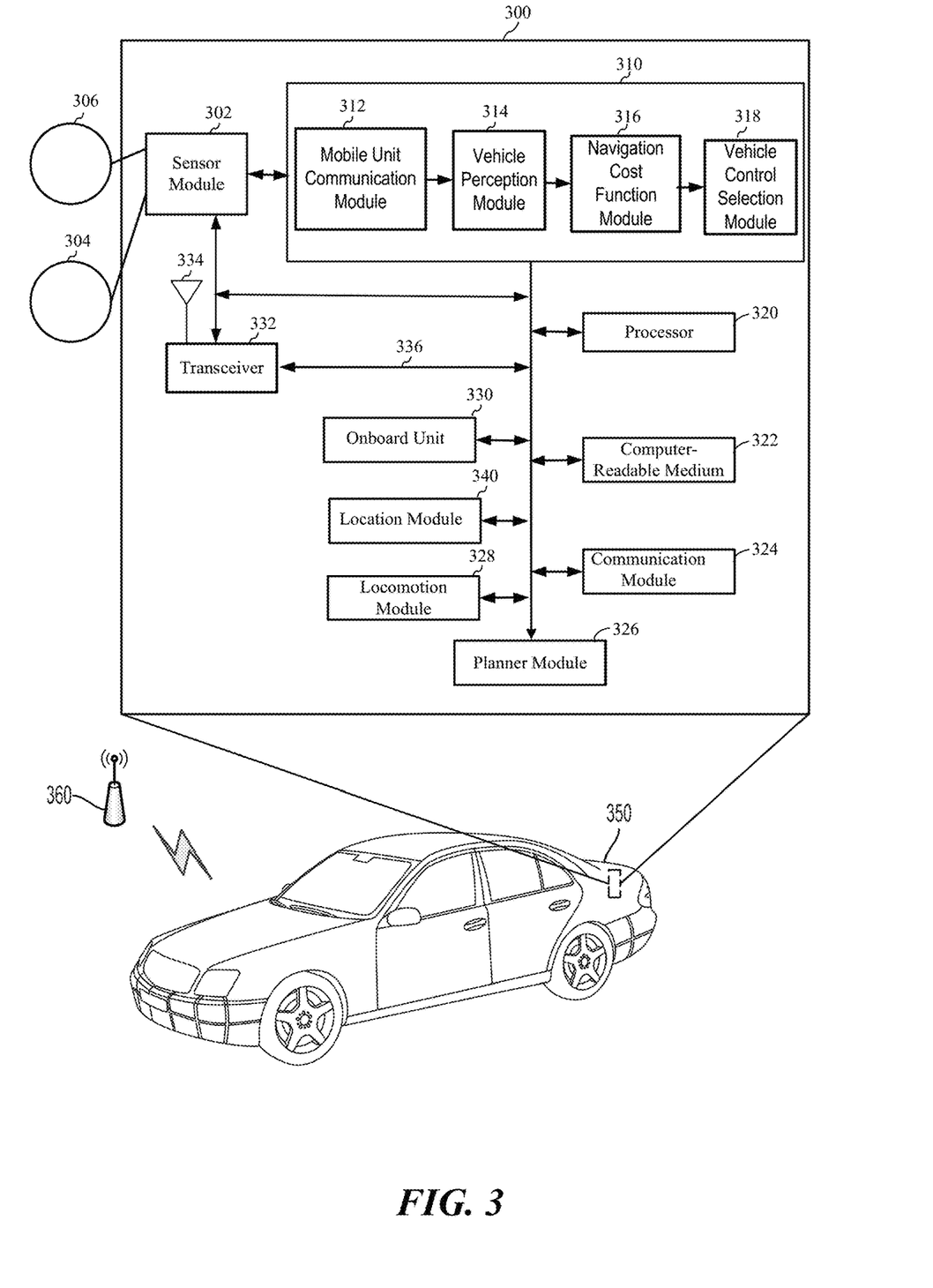
FIG. 3 is a diagram illustrating an example of a hardware implementation for a vehicle behavior control system, according to aspects of the present disclosure.

FIG. 3 is a diagram illustrating an example of a hardware implementation for a vehicle behavior control system 300, according to aspects of the present disclosure. The vehicle behavior control system 300 may be configured for improved tactical driving decisions using a navigation cost function. For example, a navigation cost function is used to improve a merging efficiency of an ego vehicle prior to a critical intersection at which to perform a tactical driving maneuver (e.g., a right/left turn). The vehicle behavior control system 300 may be a component of a vehicle, a robotic device, or other non-autonomous device (e.g., non-autonomous vehicles, ride-share cars, etc.). For example, as shown in FIG. 3, the vehicle behavior control system 300 is a component of a car 350.

Aspects of the present disclosure are not limited to the vehicle behavior control system 300 being a component of the car 350. Other devices, such as a bus, motorcycle, or other like non-autonomous vehicle, are also contemplated for implementing the vehicle behavior control system 300. In this example, the car 350 may be autonomous or semi-autonomous; however, other configurations for the car 350 are contemplated, such as an advanced driver assistance system (ADAS).

The vehicle behavior control system 300 may be implemented with an interconnected architecture, represented generally by an interconnect 336. The interconnect 336 may include any number of point-to-point interconnects, buses, and/or bridges depending on the specific application of the vehicle behavior control system 300 and the overall design constraints. The interconnect 336 links together various circuits, including one or more processors and/or hardware modules, represented by a sensor module 302, a vehicle behavior controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle behavior control system 300 includes a transceiver 332 coupled to the sensor module 302, the vehicle behavior controller 310, the processor 320, the computer-readable medium 322, the communication module 324, the planner module 326, the locomotion module 328, the location module 340, and the onboard unit 330. The transceiver 332 is also coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle behavior controller 310 to/from connected vehicles within the vicinity of the car 350.

The vehicle behavior control system 300 includes the processor 320 coupled to the computer-readable medium 322. The processor 320 performs processing, including the execution of software stored on the computer-readable medium 322 to provide functionality according to the present disclosure. The software, when executed by the processor 320, causes the vehicle behavior control system 300 to perform the various functions described for vehicle behavior control (e.g., vehicle merging control prior to a critical intersection) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle behavior controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, Wi-Fi, long term evolution (LTE), 4G, 3G, etc. The communication module 324 may also communicate with other components of the car 350 that are not modules of the vehicle behavior control system 300. The transceiver 332 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MIMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle behavior control system 300 also includes the planner module 326 for planning a route and controlling the locomotion of the car 350, via the locomotion module 328 for autonomous operation of the car 350 to enable travel to a goal destination. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), drivers can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle behavior controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle behavior controller 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle behavior controller 310 may receive sensor data directly from the first sensor 306 and the second sensor 304 to determine, for example, input traffic data images.

As shown in FIG. 3, the vehicle behavior controller 310 includes a mobile unit communication module 312, a vehicle perception module 314, a navigation cost function module 316, and a vehicle control selection module 318. The mobile unit communication module 312, the vehicle perception module 314, the navigation cost function module 316, and the vehicle control selection module 318 may be components of a same or different artificial neural network, such as a deep convolutional neural network (CNN). The vehicle behavior controller 310 is not limited to a CNN. The vehicle behavior controller 310 receives a data stream from the first sensor 306 and/or the second sensor 304. The data stream may include a 2D RGB image from the first sensor 306 and LiDAR data points from the second sensor 304. The data stream may include multiple frames, such as image frames of traffic data.

The mobile unit communication module 312 may be configured to communicate with other connected vehicles within proximity of the car 350. This communication may acquire traffic state information used by the navigation cost function module 316 to compute a navigation cost function associated with potential tactical driving decisions. For example, a merging behavior of the car 350 may be controlled by the vehicle behavior controller 310 in a manner that seeks to minimize a navigation cost function associated with merging into a target lane. The navigation cost function associated with merging into a target lane is minimized for the ego vehicle to make a more fluid entry into a merge gap between vehicles in a target lane, for example, as shown in FIG. 4.

Figure 4:
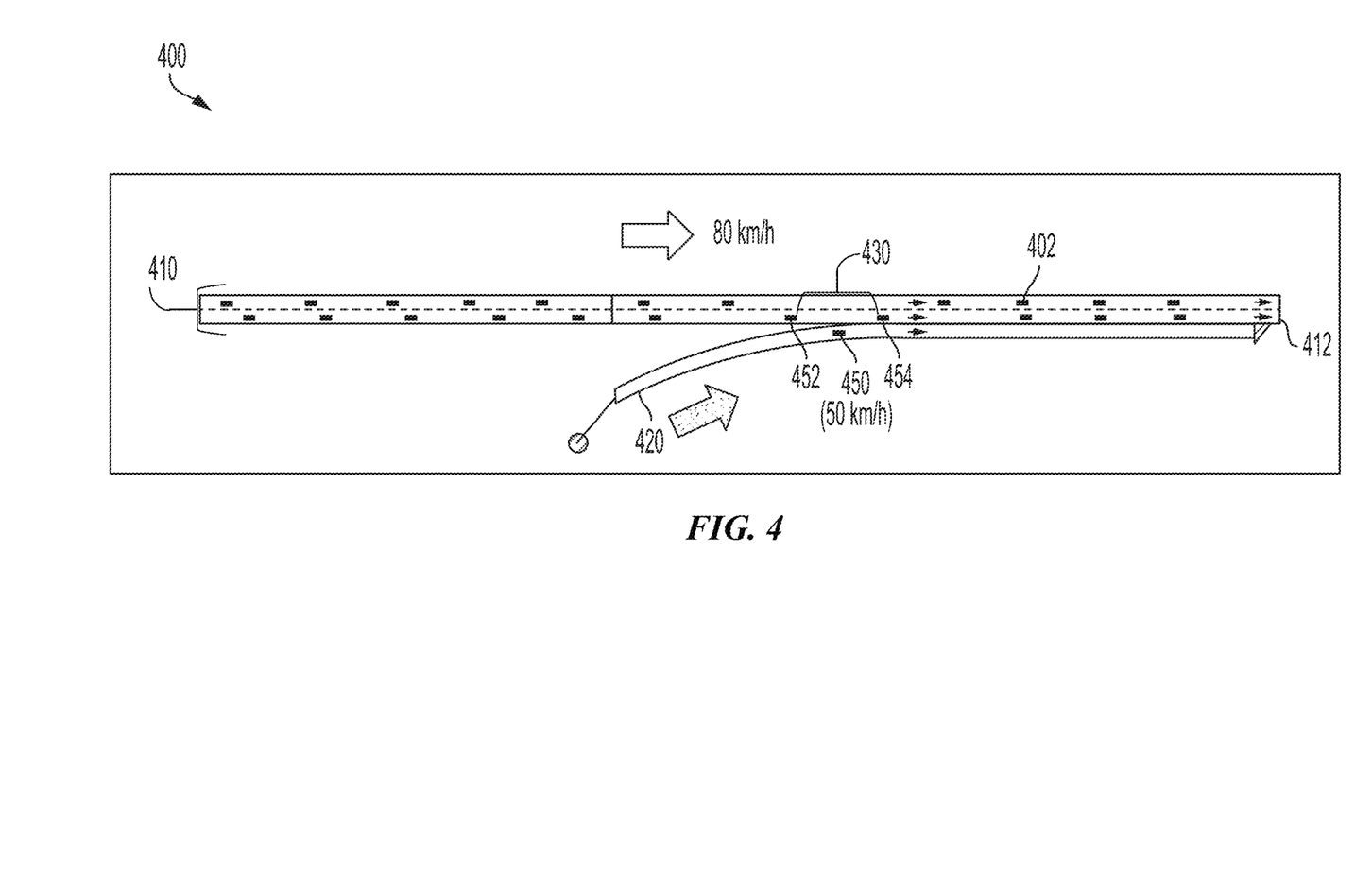
FIG. 4 is a diagram illustrating an overview of a highway environment, including vehicles on a highway main-lane and a controlled ego vehicle on a highway on-ramp, according to aspects of the present disclosure.

FIG. 4 is a diagram illustrating an overview of a highway environment, including vehicles on a highway main-lane and a controlled ego vehicle on a highway on-ramp, according to aspects of the present disclosure. The highway environment 400 includes a highway main-lane 410 having vehicles 402, and a highway on-ramp 420 having a controlled ego vehicle 450. In this configuration, the controlled ego vehicle 450 is configured to monitor the dynamics of both vehicles on the highway main-lane 410, as well as vehicles on the highway on-ramp 420. In this example, the controlled ego vehicle 450, may be the car 350, shown in FIG. 3.

In one aspect of the present disclosure, the controlled ego vehicle 450 is essentially controlled by a vehicle controller (e.g., the vehicle behavior controller 310 of FIG. 3). In this example, the controlled ego vehicle 450 (e.g., the vehicle perception module 314 of FIG. 3) identifies a merge gap 430 between a first vehicle 452 and a second vehicle 454 on a first highway main-lane 412 (e.g., a target lane). That is, the controlled ego vehicle 450 is configured to identify the merge gap 430 to enable entry onto the first highway main-lane 412 from on the highway on-ramp 420. In this example, the highway on-ramp is a drop-lane that ends, which may be identified as a critical intersection, as further described below. According to aspects of the present disclosure, the controlled ego vehicle 450 is configured to select a vehicle control action to enable the controlled ego vehicle 450 to safely and successfully merge into the merge gap 430.

In aspects of the present disclosure, the controlled ego vehicle 450 is configured to perform vehicle control actions to minimize the navigation cost function associated with merging into the merge gap 430. Minimizing the navigation cost function increases the probability of a successful merge onto the highway main-lane 410 (e.g., a target lane). In operation, the vehicle controller (e.g., vehicle control selection module 318 of FIG. 3) adjusts a speed of the controlled ego vehicle 450 to efficiently and smoothly merge into traffic on the highway main-lane 410 from the highway on-ramp 420. In this example, if a target speed of the controlled ego vehicle 450 is not safe, the vehicle controller ignores the target speed and selects a different merge gap. Therefore, a collision avoidance function is provided by the vehicle controller (e.g., vehicle behavior controller 310).

In this example, the controlled ego vehicle 450 enters the highway on-ramp 420 at fifty (50) kilometers (km) per hour (km/h), while the flow of traffic of the vehicles 402 is approximately eighty (80) km/h. Subsequently, the speed of the controlled ego vehicle 450 is controlled to minimize the navigation cost function associated with a tactical driving maneuver of transitioning into the merge gap 430. The vehicle controller controls the speed of the controlled ego vehicle 450 until the controlled ego vehicle 450 successfully merges onto the highway main-lane 410. In this example, the first vehicle 452 and the second vehicle 454 may be connected vehicles configured to communicate with the controlled ego vehicle 450 to enable maximizing the exposure time to enter into the merge gap 430 and onto the highway main-lane 410. The navigation cost function associated with entering a merge gap is further complicated when the merge action is performed before a critical intersection at which a vehicle action is performed, for example, as shown in FIG. 5.

Figure 5:
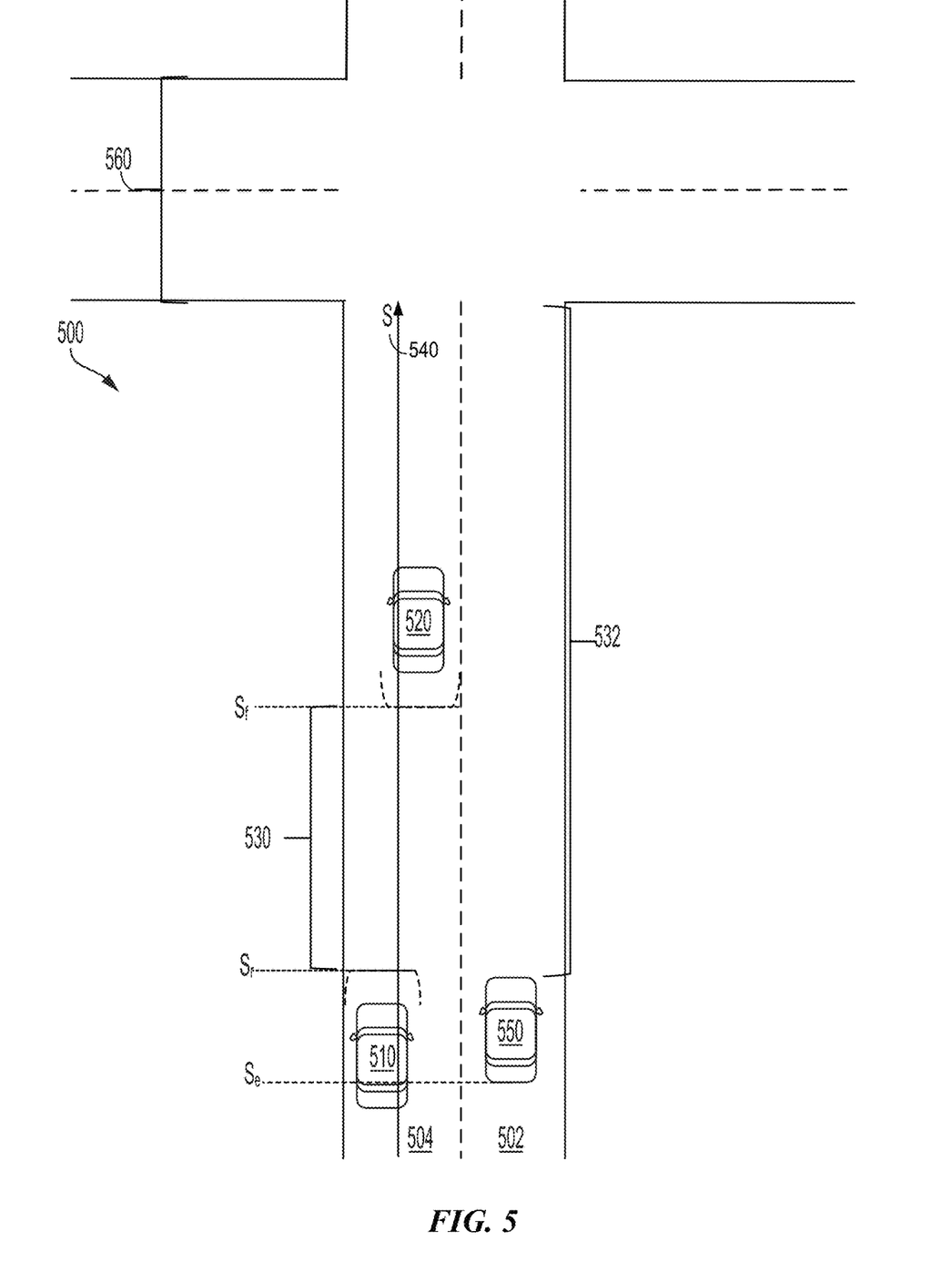
FIG. 5 is a diagram illustrating an overview of a traffic environment, including vehicles on highway lanes and a controlled ego vehicle prior to a lane change before a critical intersection, according to aspects of the present disclosure.

FIG. 5 is a diagram illustrating an overview of a traffic environment, including vehicles on roadway lanes and a controlled ego vehicle prior to a lane change, according to aspects of the present disclosure. The traffic environment includes a multilane roadway 500 (e.g., a two lane roadway), having a first lane 502 and a target lane 504 (e.g., a second lane), in which the first lane 502 includes a controlled ego vehicle 550. In this configuration, the controlled ego vehicle 550 is configured to monitor the dynamics of vehicles on the multilane roadway 500, such as a first vehicle 510 and a second vehicle 520 in the target lane 504 of the multilane roadway 500. In this example, the controlled ego vehicle 550 desires to perform a tactical driving maneuver of changing lanes from the first lane 502 to the target lane 504 of the multilane roadway 500. In this example, the controlled ego vehicle 550 may be the car 350, shown in FIG. 3.

Aspects of the present disclosure are directed to a vehicle behavior control system that assesses a navigation cost of a tactical driving decision, for determining whether to perform a tactical driving maneuver. As described herein, a "tactical driving decision" (of whether to provide a tactical driving maneuver) refers to a high level decision during operation of an ego vehicle. In a simplest form, the high level decision of whether to maintain the ego vehicle in the current lane or change lanes to a target lane (e.g., a left/right merge operation) is a tactical driving decision. As described herein, a "navigation cost" may refer to a number that informs the autonomous driving agent (e.g., vehicle behavior control system) of "how good" a tactical driving maneuver is to achieve the autonomous driving agent's goal (e.g., reaching a target destination).

In one aspect of the present disclosure, the controlled ego vehicle 550 is controlled by a vehicle controller (e.g., the vehicle behavior controller 310 of FIG. 3). In this example, the controlled ego vehicle 550 (e.g., the vehicle perception module 314 of FIG. 3) identifies a merge gap 530 between the first vehicle 510 and the second vehicle 520 in the target lane 504. That is, the controlled ego vehicle 550 is configured to identify the merge gap 530 to enable a lane change (e.g., a tactical driving maneuver) of the controlled ego vehicle 550 from the first lane 502 to the target lane 504. The controlled ego vehicle 550 is configured to compute the navigation cost associated with performing the tactical driving maneuver of merging into the merge gap 530 prior to a critical intersection 560. In this example, the controlled ego vehicle 550 is merging into the target lane 504 to enable a left hand turn at the critical intersection 560 to enable the controlled ego vehicle 550 to reach a target destination.

As further illustrated in FIG. 5, an S-axis 540 indicates a position along the target lane 504 of the multilane roadway 500. In this example, the controlled ego vehicle 550 is shown at a position $S_e$. The position $S_e$ can change with time "t", so it becomes a function $S_e(t)$. The same holds for the first vehicle 510 and the second vehicle 520 that define the merge gap 530. The first vehicle 510 (e.g., rear obstacle) has position $S_r(t)$ and the second vehicle 520 (e.g., front obstacle) has position $S_f(t)$. The positions $S_r$ and $S_f$ can be chosen to incorporate a predetermined amount of padding distance to account for a safe driving distance and the length of the controlled ego vehicle 550. Another parameter in computing the navigational cost associated with a tactical driving maneuver of merging into the target lane is a distance 532 to the critical intersection.

According to one aspect of the present disclosure, the vehicle behavior control system is configured to compute a navigation cost function associated with a tactical driving maneuver (e.g., a merge into the target lane 504 before the critical intersection 560). In one aspect of the present disclosure, the navigation cost function is based on three values that are computed for every lane l (e.g., 502 and 504): (1) a distance to go (G(l)); (2) a critical intersection distance (C(l)); and (3) a number of required lane changes (I(l)). The "distance to go" or G(l) may refer to total distance between the beginning of a road segment and a goal/target location (e.g., all the lanes in the same segment share the same "distance to go" or G(l). The "critical intersection distance" or C(l) is provided for every particular lane, assuming the ego vehicle continues to drive on that lane, without changing lanes.

For some lanes, the critical intersection distance refers to a distance that would cause the controlled ego vehicle 550 to eventually drive off the mission plan for reaching the goal/target location. In this example, the point where deviation from the mission plan occurs is the critical intersection; namely the distance to that point (if it exists). The "number of required lane changes" or I(l) is provided for some lanes in which, if the controlled ego vehicle 550 continued to drive along and not change lanes, the controlled ego vehicle 550 would eventually drive off the mission plan.

The controlled ego vehicle 550, however, may stay on the mission plan by performing some lane changes. The minimum number of lane changes that allows the controlled ego vehicle 550 to reach the goal/target destination is the number of required lane changes for the controlled ego vehicle 550. It should be noted that a value for the "critical intersection distance" or C(l) exists if and only if a number of specified lane changes I(l) is greater than zero (e.g., I(l)>0). These values can be computed simply from a map topology (e.g., the manner in which lanes are connected) and the goal/target destination. In this example, sensor detection and traffic estimation are not performed.

Assuming that 'l' is the lane reached by a maneuver and 's' is the distance along that lane, the navigation cost function is:

$$\Phi(s, l, c, g, i) = (G(l) - s) + \beta_1 I(l) \alpha(C(l) - s) \quad (1)$$

Where the function "alpha" is defined as:

$$\alpha(x) = \begin{cases} 1 - 0.5 \dfrac{x}{x_h} & \text{if } 0 \leq x \leq x_h \\ 0.5 \left(1 - \dfrac{x - x_h}{x_z - x_h}\right) & \text{if } x_h \leq x \leq x_z \\ 0 & \text{if } x > x_z \end{cases} \quad (2)$$

In the context of this disclosure, $\beta$, $x_h$, and $x_z$ are predetermined configuration values.

In aspects of the present disclosure, the controlled ego vehicle 550 is configured to perform vehicle control actions to minimize the navigation cost function according to Equation (2). Minimizing the navigation cost function associated with tactical driving decisions/maneuvers increases the safety of a successful trip to a goal/target destination. In operation, the vehicle controller (e.g., vehicle control selection module 318 of FIG. 3) adjusts an acceleration/braking of the controlled ego vehicle 550 to efficiently and smoothly perform tactical driving maneuvers, such as merging from the first lane 502 to the target lane 504. In this example, if the navigation cost function associated with a tactical driving maneuver of the controlled ego vehicle 550 is high, the vehicle controller selects a different tactical driving maneuver with a lower navigation cost value.

Figure 6:
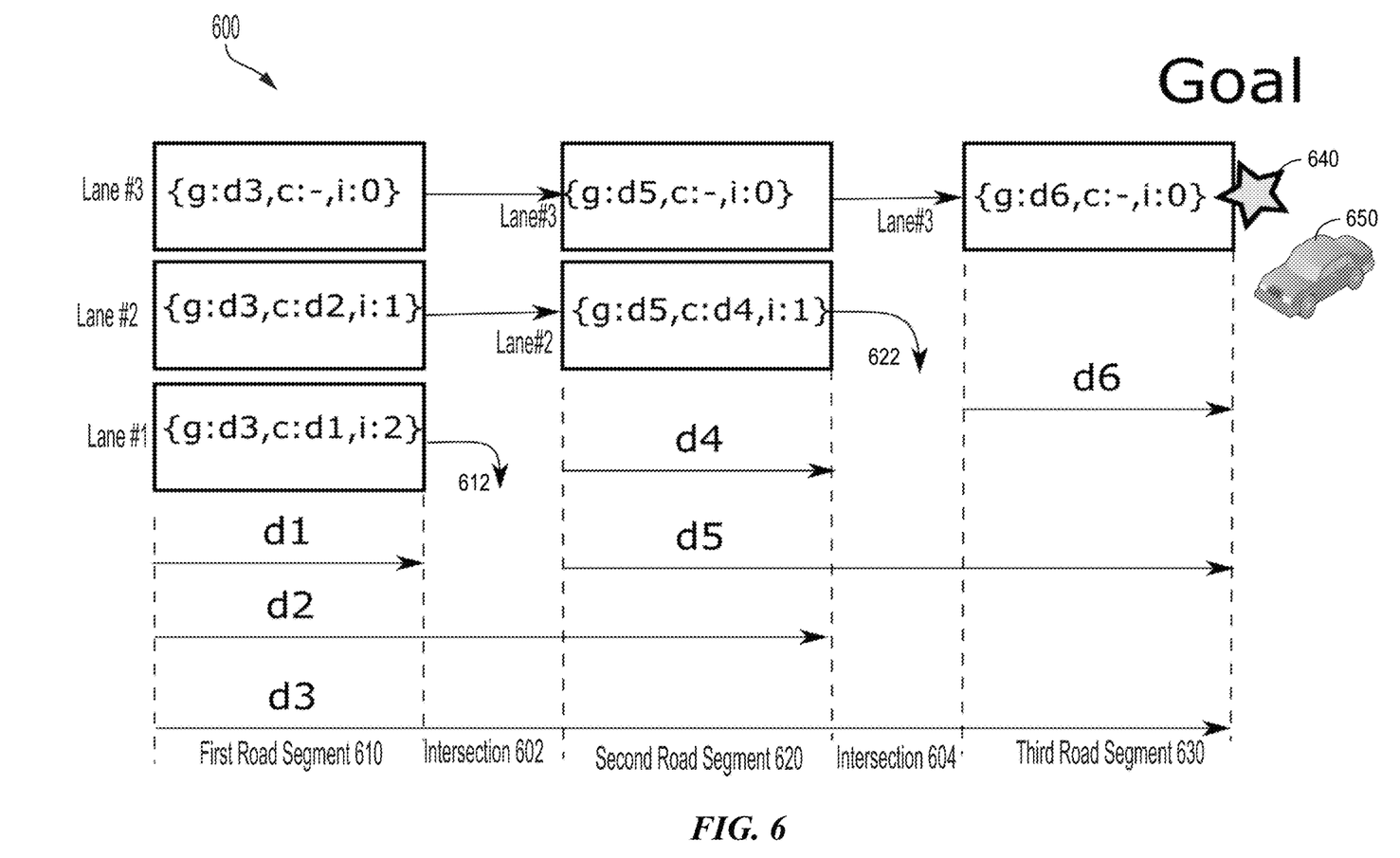
FIG. 6 is a diagram illustrating an overview of a traffic environment, including roadway segments traversed by a controlled ego vehicle to reach a goal/target location, according to aspects of the present disclosure.

FIG. 6 is a diagram illustrating an overview of a traffic environment, including roadway segments traversed by a controlled ego vehicle to reach a goal/target location, according to aspects of the present disclosure. According to this aspect of the present disclosure, a driving environment 600 is composed of road segments (e.g., groups of adjacent lanes) and intersections (where different groups of lanes connect to each other). In this example, the driving environment 600 includes a first road segment 610, a first intersection 602, a second road segment 620, a second intersection 604, and a third road segment 630 to reach a goal/target destination 640 or goal/target location 640. The vehicle behavior control system of a controlled ego vehicle 650 is applicable in every part of the driving environment 600 and it is not restricted to intersections.

For example, the controlled ego vehicle 650 is given a mission plan, which is composed of the sequence of road segments (e.g., 610, 620, and 630) to traverse for eventually reaching the goal/target destination 640. In this example, the vehicle behavior control system is configured to assess the cost of a driving maneuver based on a last position (e.g., on a map) reached by the driving maneuver. In this example the controlled ego vehicle 650 begins travel on the first road segment 610, which includes three lanes (e.g., Lane #1, Lane #2, and Lane #3). Each lane indicates a distance (g) to the goal/target location 640, a distance (c) to a critical intersection, and a number (i) of lane changes specified to reach the goal/target location 640 from the respective lane.

As shown in FIG. 6, if the controlled ego vehicle 650 starts out in Lane #3 of the first road segment 610, the controlled ego vehicle is on a direct path to the goal/target destination 640 because no lane changes (i:0) or critical intersections (c:-) are specified. Instead, by simply traveling a distance (d3) along Lane #3 through the first intersection 602, the second road segment 620 (distance d5 left to the goal/target destination 640), the second intersection 604, and onto the third road segment 630 (distance d6 left to the goal/target destination 640) to reach the goal/target destination 640.

From Lane #2 of the first road segment 610, the controlled ego vehicle 650 may remain in Lane #2 and travel a distance (d2) though the first intersection 602 to the second road segment 620. Lane #2 of the second road segment 620 will veer off the mission plan if the controlled ego vehicle 650 remains in Lane #2, as shown by arrow 622 (e.g., i:1—one lane change required). Instead, once the controlled ego vehicle 650 reaches the second road segment 620, the controlled ego vehicle 650 has a distance (d4) to merge into Lane #3. Otherwise, the controlled ego vehicle 650 will fall off the mission plan and not reach the goal/target destination 640.

From Lane #1 of the first road segment 610, the mission plan for reaching the goal/target location 640 is more complicated because multiple lane changes (i:2) are specified to reach the goal/target location 640. That is, from Lane #1, the controlled ego vehicle 650 will veer off the mission plan if the controlled ego vehicle 650 remains in Lane #1 (e.g., c:d1), as shown by arrow 612 (e.g., i:2—two lane changes required). Assuming the controlled ego vehicle 650 merges into Lane #2, the controlled ego vehicle 650 will veer off the mission plan if the controlled ego vehicle 650 remains in Lane #2, as shown by arrow 622 (e.g., i:1—one lane change required). Instead, once the controlled ego vehicle 650 reaches the second road segment 620, the controlled ego vehicle 650 has a distance (d4) to merge into Lane #3. Otherwise, the controlled ego vehicle 650 will fall off the mission plan and not reach the goal/target location 640.

Figure 7:
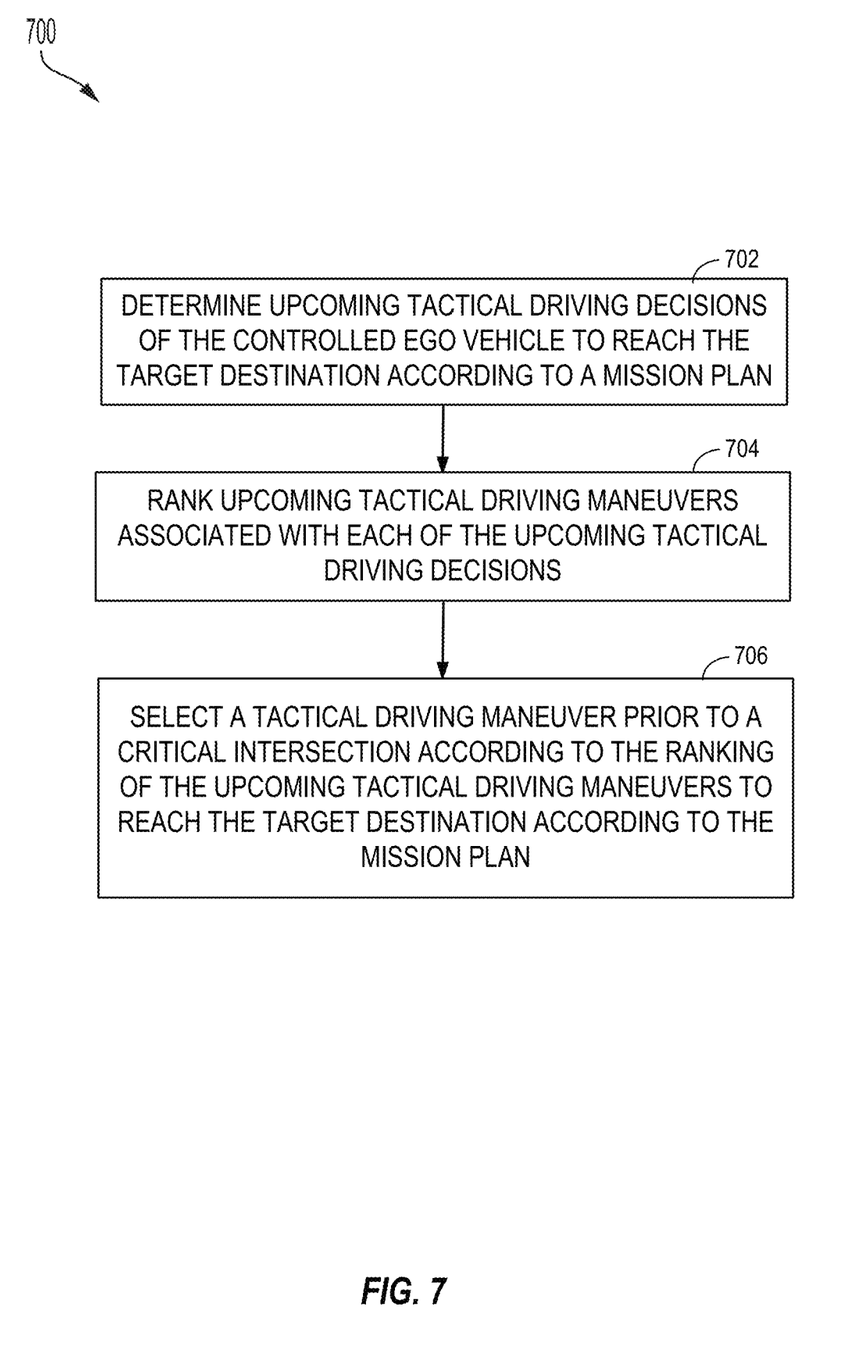
FIG. 7 is a flowchart illustrating a method of improving a merging efficiency of an ego vehicle, according to aspects of the present disclosure.

FIG. 7 is a flowchart illustrating a method of improving a tactical driving decision of a controlled ego vehicle, according to aspects of the present disclosure. A method 700 begins at block 702, in which upcoming tactical driving decisions of the controlled ego vehicle are determined to reach the target destination according to a mission plan. For example, as shown in FIG. 5, the controlled ego vehicle 550 identifies a merge gap 530 between the first vehicle 510 and the second vehicle 520 in the target lane 504 prior to the critical intersection 560. That is, the controlled ego vehicle 550 is configured to identify the merge gap 530 to enable a lane change of the controlled ego vehicle 550 from the first lane 502 to the target lane 504, enabling a left/right turn at the critical intersection 560.

At block 704, upcoming tactical driving maneuvers associated with each of the upcoming tactical driving decisions are ranked. For example, the navigation cost function is based on three values that are computed for every lane l (e.g., 502 and 504): (1) a distance to go (G(l)); (2) a critical intersection distance (C(l)); and (3) a number of specified lane changes (I(l)). The "distance to go" or G(l) may refer to total distance between the end of a road segment and a goal/target location (e.g., all the lanes in the same segment share the same "distance to go" or G(l)). As shown in FIG. 5, the controlled ego vehicle 550 is configured to compute a navigation cost function associated with merging into the merge gap 530 prior to the critical intersection 560. At block 706, selecting a tactical driving maneuver prior to a critical intersection according to the ranking of the upcoming tactical driving maneuvers to reach the target destination according to the mission plan.

Minimizing the navigation cost function increases the probability of a successful lane change within the multilane roadway 500. This process includes adjusting a selected acceleration/braking value of the ego vehicle for each of the one or more merge gaps to maximize the exposure time for each of the one or more merge gaps. This process further includes selecting a merge gap from the one or more merge gaps according to a corresponding exposure time.

The method 700 also includes selecting a vehicle control action to merge the ego vehicle into the merge gap between the first vehicle and the second vehicle in the target lane. For example, as shown in FIG. 5, the vehicle controller (e.g., vehicle control selection module 318 of FIG. 3) adjusts an acceleration/braking of the controlled ego vehicle 550 to efficiently and smoothly merge from the first lane 502 to the target lane 504. The selecting of the tactical driving maneuver in block 706 may also include discarding a tactical driving maneuver from the tactical driving maneuvers if the associated navigation cost function of the discarding tactical driving maneuver is greater than other navigation cost function values.

In some aspects, the method shown in FIG. 7 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102), and/or other components included therein of the autonomous vehicle 150 or the vehicle behavior control system 300.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects, computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method to select between tactical driving decisions of a controlled ego vehicle to reach a target destination, the method comprising:
    determining upcoming tactical driving decisions of the controlled ego vehicle to reach the target destination according to a mission plan;
    ranking upcoming tactical driving maneuvers associated with each of the upcoming tactical driving decisions;
    selecting a tactical driving maneuver prior to a critical intersection according to the ranking of the upcoming tactical driving maneuvers to reach the target destination according to the mission plan, in which the critical intersection comprises an intersection in which the ego vehicle is to make a turn based on the mission plan to reach the target destination;
    performing the selected tactical driving maneuver prior to the critical intersection; and
    turning the ego vehicle at the intersection and performing one or more selected ones of the upcoming tactical driving maneuvers to reach the target destination according to the mission plan.

2. The method of claim 1, in which determining the upcoming tactical driving decisions comprises:
    detecting one or more merge gaps between vehicles in a target lane of a roadway prior to the critical intersection; and
    selecting a vehicle control action to merge the ego vehicle into each of the one or more merge gaps in the target lane prior to the critical intersection as the upcoming tactical driving decisions.

3. The method of claim 1, in which ranking the upcoming tactical driving maneuvers comprises:
    computing a navigation cost function associated with changing lanes into one or more detected merge gaps between vehicles in a target lane of a multilane roadway prior to the critical intersection; and
    selecting a vehicle control action to merge the ego vehicle into one of the one or more merge gaps in the target lane prior to the critical intersection as the upcoming tactical driving decisions.

4. The method of claim 3, in which the vehicle control action comprises accelerating a speed of the ego vehicle to successfully merge into the target lane of the multilane roadway.

5. The method of claim 3, in which the vehicle control action comprises decelerating a speed of the ego vehicle to successfully merge into the target lane of the multilane roadway.

6. The method of claim 1, in which determining the upcoming tactical driving decisions comprises determining a position and an acceleration value of a first vehicle and a second vehicle in a target lane of a multilane roadway using vehicle-to-vehicle (V2V) communication between the ego vehicle and the first vehicle and the second vehicle.

7. The method of claim 6, in which the ego vehicle is on an on-ramp of the multilane roadway and the target lane is a first lane of the multilane roadway.

8. The method of claim 6, in which the ego vehicle is in a first lane of the multilane roadway and the target lane comprises an off-ramp of a multilane roadway.

9. The method of claim 6, in which the ego vehicle is in a drop-lane of a multilane roadway and the target lane is an adjacent lane of the multilane roadway.

10. The method of claim 2, further comprising discarding a merge gap from the one or more merge gaps if a navigation cost function for the merge gap is greater than navigation cost functions associated with others of the one or more merge gaps.

11. A non-transitory computer-readable medium having program code recorded thereon to select between tactical driving decisions of a controlled ego vehicle to reach a target destination, the program code being executed by a processor and comprising:
    program code to determine upcoming tactical driving decisions of the controlled ego vehicle to reach the target destination according to a mission plan;
    program code to rank upcoming tactical driving maneuvers associated with each of the upcoming tactical driving decisions;
    program code to select a tactical driving maneuver prior to a critical intersection according to the ranking of the upcoming tactical driving maneuvers to reach the target destination according to the mission plan, in which the critical intersection comprises an intersection in which the ego vehicle is to make a turn based on the mission plan to reach the target destination;
    program code to perform, by the controlled ego vehicle, the selected tactical driving maneuver prior to the critical intersection; and
    program code to turn the ego vehicle at the intersection and to perform one or more selected ones of the upcoming tactical driving maneuvers to reach the target destination according to the mission plan.

12. The non-transitory computer-readable medium of claim 11, in which the program code to determine the upcoming tactical driving decisions comprises:
    program code to detect one or more merge gaps between vehicles in a target lane of a roadway prior to the critical intersection; and
    program code to select a vehicle control action to merge the ego vehicle into each of the one or more merge gaps in the target lane prior to the critical intersection as the upcoming tactical driving decisions.

13. The non-transitory computer-readable medium of claim 11, in which the program code to rank the upcoming tactical driving maneuvers comprises:
    program code to compute a navigation cost function associated with changing lanes into one or more detected merge gaps between vehicles in a target lane of a roadway prior to the critical intersection; and program code to select a vehicle control action to merge the ego vehicle into one of the one or more merge gaps in the target lane prior to the critical intersection as the upcoming tactical driving decisions.

14. The non-transitory computer-readable medium of claim 11, in which the program code to determine the upcoming tactical driving decisions comprises program code to determine a position and an acceleration value of a first vehicle and a second vehicle in a target lane of a multilane roadway using vehicle-to-vehicle (V2V) communication between the ego vehicle and the first vehicle and the second vehicle.

15. The non-transitory computer-readable medium of claim 12, further comprising program code to discard a merge gap from the one or more merge gaps if a navigation cost function for the merge gap is greater than navigation cost functions associated with others of the one or more merge gaps.

16. A system to select between tactical driving decisions of a controlled ego vehicle to reach a target destination, the system comprising:
- a vehicle perception module, including a convolutional neural network configured to determine upcoming tactical driving decisions of the controlled ego vehicle to reach the target destination according to a mission plan;
- a navigation cost function module configured to rank upcoming tactical driving maneuvers associated with each of the upcoming tactical driving decisions;
- a vehicle control selection module configured to select a tactical driving maneuver prior to a critical intersection according to the ranking of the upcoming tactical driving maneuvers to reach the target destination according to the mission plan, in which the critical intersection comprises an intersection in which the ego vehicle is to make a turn based on the mission plan to reach the target destination; and
- a vehicle behavior controller to perform, by the controlled ego vehicle, the selected tactical driving maneuver prior to the critical intersection, and to turn the ego vehicle at the intersection and to perform one or more selected ones of the upcoming tactical driving maneuvers to reach the target destination according to the mission plan.

17. The system of claim 16,
in which the navigation cost function module is further configured to compute a navigation cost function associated with changing lanes into one or more detected merge gaps between vehicles in a target lane of a multilane roadway prior to the critical intersection; and
in which the vehicle control selection module is further configured to select a vehicle control action to merge the ego vehicle into one of the one or more merge gaps in the target lane prior to the critical intersection as the upcoming tactical driving decisions.

18. The system of claim 17, further comprises a controller to perform the vehicle control action by accelerating a speed of the ego vehicle to successfully merge into the target lane of the multilane roadway.

19. The system of claim 17, further comprises a controller to perform the vehicle control action by decelerating a speed of the ego vehicle to successfully merge into the target lane of the multilane roadway.

20. The system of claim 17, further comprises a controller to perform the vehicle control action by maintaining a speed of the ego vehicle to successfully merge into the target lane of the multilane roadway.

* * * * *